United States Patent [19]
Morse

[11] 3,848,306
[45] Nov. 19, 1974

[54] PROCESS FOR PRODUCING A BEARING
[75] Inventor: John W. Morse, Shrewsbury, Mass.
[73] Assignee: Engineering Plastic, Inc., Westboro, Mass.
[22] Filed: Oct. 9, 1973
[21] Appl. No.: 404,698

Related U.S. Application Data
[60] Division of Ser. No. 316,221, Dec. 18, 1972, abandoned, which is a continuation of Ser. No. 138,937, April 30, 1971, abandoned.

[52] U.S. Cl. .......................................... 29/149.5 NM
[51] Int. Cl. ............................................ B23p 11/00
[58] Field of Search .... 29/149.5 NM, 149.5 R, 149.5 PM; 308/238

[56] References Cited
UNITED STATES PATENTS

| 2,989,355 | 6/1961 | Terhorst | 308/238 |
| 3,252,346 | 5/1966 | Prior | 308/238 X |
| 3,514,831 | 6/1970 | Bruch et al. | 29/149.5 NM |

Primary Examiner—Thomas H. Eager
Attorney, Agent, or Firm—Norman S. Blodgett; Gerry A. Blodgett

[57] ABSTRACT

Process for making a bearing, the major step of which is swaging two layers into a tube of circular cross-section.

3 Claims, 5 Drawing Figures

PATENTED NOV 19 1974 3,848,306
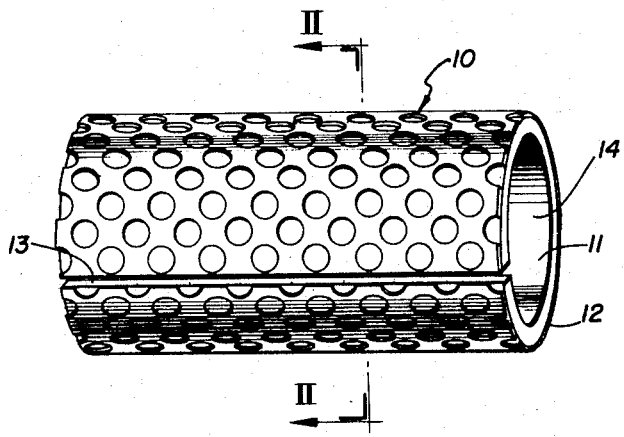
FIG. 1
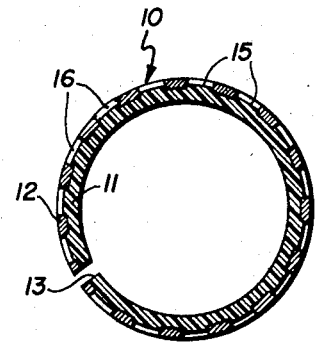
FIG. 2
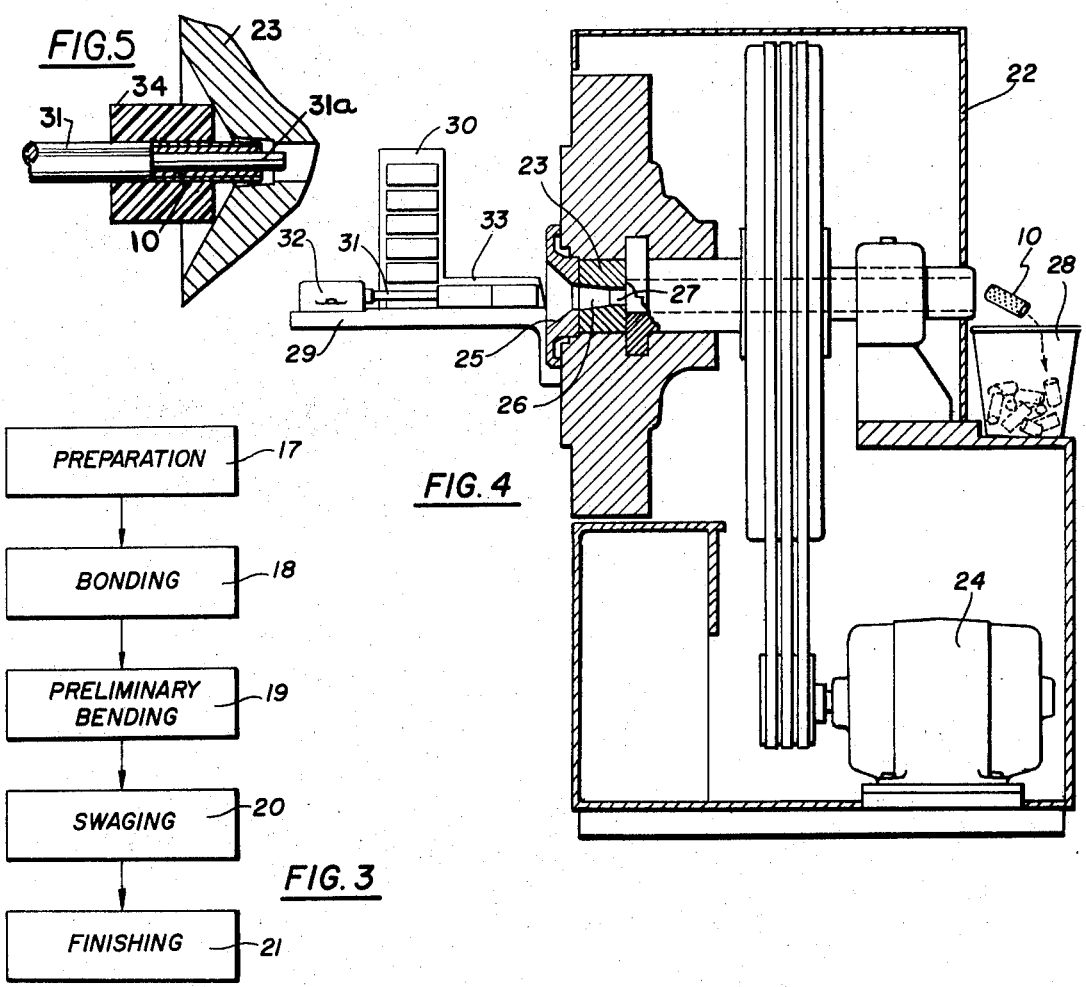
FIG. 5
FIG. 4
FIG. 3
- PREPARATION — 17
- BONDING — 18
- PRELIMINARY BENDING — 19
- SWAGING — 20
- FINISHING — 21

3,848,306

PROCESS FOR PRODUCING A BEARING

This is a division, of application Ser. No. 316,221 filed 18 Dec. 1972, which is a continuation of application Ser. No. 138,937 filed 30 Apr. 1971, both applications now abandoned.

BACKGROUND OF THE INVENTION

It is common practice to manufacture the same bearings by use of suitable plastic such as Teflon combined with a metal sheet to give the resultant bearings strength. This has most commonly been accomplished by sintering a layer of powdered Teflon to a tube of metal screen. The metal screen is perforated and the powder is sintered into locking engagement with the perforations. The resulting bearing suffers from a number of deficiencies, not the least of which is that it is difficult to manufacture it in this way and obtain a perfectly smooth cylindrical surface for the purpose of bearing a spindle or the like. An out-of-round condition will cause local stress in portions of the bearing and result in breakage. Furthermore, an out-of-round bearing produces friction on the spindle and makes the spindle difficult to turn. Also, the use of the sintered plastic results in a bearing having less than the optimum density, which means that it is not as strong and as rigid as would otherwise be desirable. The sintering method does not lend itself to production techniques and it is difficult to maintain quality control when this process is used. These and other difficulties experienced with the prior art devices have been obviated in a novel manner by the present invention.

It is, therefore, an outstanding object of the invention to provide a bearing consisting of a layer of plastic and a layer of sheet metal in which the plastic and metal are strongly held together, so that they are not subject to separation during use.

Another object of this invention is the provision of a metal sheet reinforced plastic bearing in which the plastic is of high density and, therefore, very strong and rigid.

A further object of the present invention is the provision of a plain bearing of thin-wall construction which is provided with a very geometrically accurate smooth bearing surface and high weight to strength ratio.

It is another object of the instant invention to provide a process for producing a plastic-metal bearing in which quality of geometry of the bearing surface is very high and accurate reproduction from workpiece-to-workpiece is excellent.

A still further object of the invention is the provision of a process for producing a sheet metal reinforced plastic bearing producing high density plastic and excellent bonding between metal and plastic.

It is a further object of the invention to provide a process for producing a bearing consisting of a layer of plastic and a layer of perforated metal, wherein it is possible to control the pre-stress set up between the metal and the plastic to control the amount of penetration of the plastic into the perforations in the metal sheet, whereby cold-flow of the plastic in the active direction during use is substantially prevented.

With these and other objects in view, as will be apparent to those skilled in the art, the invention resides in the combination of parts set forth in the specification and covered by the claims appended hereto.

SUMMARY OF THE INVENTION

In general, the invention consists of a plain bearing having a layer of plastic and a layer of perforated metal, the plastic being of extremely high density and intruding into the perforations in the metal by considerable amounts. The metal and plastic are bonded together extremely well and the bearing has a cylindrical bearing surface of perfect geometry.

The process for making the bearing consists of initial preparation of the layer of plastic and the layer of metal, of placing the two sheets together and performing a bonding operation upon them under extreme pressure, performing a preliminary bonding of the two layers into a tube, swaging the tube into a perfect cylindrical tubular form with control flow of plastic into the perforations in the metal layer and, finally, performing a finishing operation on the bearing.

BRIEF DESCRIPTION OF THE DRAWINGS

The character of the invention, however, may be best understood by reference to one of its structural forms, as illustrated by the accompanying drawings, in which:

FIG. 1 is a perspective view of a bearing embodying the principles of the present invention, FIG. 2 is a sectional view of the bearing taken on the line II-II of FIG. 1, FIG. 3 is a flow diagram showing the process for producing the bearing, FIG. 4 is a vertical sectional view of apparatus for performing part of the process, and FIG. 5 is a vertical sectional view of a portion of the apparatus.

DESCRIPTION OF THE PREFERRED EMBODIMENT

Referring first to FIGS. 1 and 2, wherein are best shown the general features of the invention, the bearing, indicated generally by the reference numeral 10, is shown as consisting of an inner layer 11 of plastic and an outer layer 12 of perforated metal. In the preferred embodiment, the inner layer of plastic is formed of Teflon, i.e., polytetrafluoroethylene, while the outer layer of perforated metal is formed of stainless steel or similar strong metal. As is evident in the drawings, the bearing is formed from a sheet bent into a tube leaving a small gap 13 between adjacent edges, the innermost surface of the inner layer 11 being formed into a perfect cylinder to provide a bearing surface 14. As can best be seen in FIG. 2, the process of assembling the bearing causes fingers 15 to protrude from the inner layer 11 into perforations 16 extending through the outer layer of sheet metal.

In the preferred embodiment, the fingers 15 do not extend entirely through the perforations to the outer surface of the metal sheet. Two advantages are obtained by this arrangement. First of all, the outer surface of the metal sheet can be used as a smooth, cylindrical supporting surface for the bearing when it is installed in machinery or the like. Secondly, the amount of extrusion of the fingers into the perforations regulate the amount of cold flow and cold working that is provided in the plastic forming the inner layer of the bearing. A large amount of cold flow produces a high pre-stress in the bearing which makes it rather more rigid than a small amount of cold working.

The process for producing the bearing 10 can be best understood in conjunction with the flow diagram shown in FIG. 3. The first step 17 is that of preparation. The two layers, i.e., the inner layer 11 and the outer metal layer 12, are formed into a suitable rectangular shape whose surfaces are smooth and edges are somewhat beveled to produce a smooth even contact, particularly between the two engaging surfaces. In the second step 18, which is a bonding step, the two layers are pressed together under extremely high pressure. They are still in flat condition and a degree of extrusion of the plastic into the perforations 16 takes place. Bonding is provided in a press between two flat die surfaces, and the dies are heated in the well-known manner to provide a suitable softening of the plastic and to produce the bonding operation.

The third step 19 is that of the preliminary bonding. In this step, a press is used to produce a crude curling or tube formation from the flat, previously bonded layers. Specifically, the tube is formed, but the gap, which is shown as gap 13 in FIG. 2, is much wider, so that the final form of the bearing has not been reached.

The fourth step 20 is that of swaging. In this step or operation, the curved tube is pushed axially to a die having a cylindrical bore, which die is rotated at a high speed about the axis of that bore. The action of pressing and rotating brings the edges of the gap together and forms the outer surface of the tube into a perfect cylinder. This, in turn, produces a perfect cylindrical surface on the inside of the tube. For regulating the size of the bore and the rate of rotation of the die, the amount of swaging can be controlled and this, in turn, controls the temperature to which the plastic is raised by the operation, the pressure to which it is subjected, the amount of extrusion of the fingers 15 into the bores 16, and the amount of cold flow to which the bearing to be is subjected.

The fifth step 21 is that of finishing, wherein the bearing is subjected to various steps to remove any defects produced and remaining on the bearing due to previous steps of the operation. Such steps can include squaring off the ends of the bearing.

Referring to FIG. 4, the apparatus 22 is used for the swaging step 20 of the process. The die 23 is rotated by means of a motor 24 whose center of the die extends conical counterbores 25 and 26 leading to a cylindrical bore 27. At the rear of the machine is located a container 28 into which the finished bearings 10 drop. At the front of the machine adjacent to the entrances to the counterbores 25 and 26 is a table 29 by which the workpieces are introduced into the apparatus. In the central portion of the table rises a chute 30 which serves to introduce the workpieces one at a time into the path of the piston 32 of a cylinder 33. A rod pushes the workpieces in an end-to-end manner along a trough 33 leading to the swaging apparatus 22.

It can be seen that the bearing 10 produced by the process described above can be provided with a perfect cylindrical bearing surface 14. Because the Teflon is formed initially in the form of a sheet that can be selected of the highest density and this density remains in the finished bearing. The control over the swaging operation provides a control over cold working as well as the interlocking between the plastic fingers 15 and the perforations 16 in the metal sheet. It will be understood that when the tube is formed, the gap 13 is practically non-existent in the bore of the swaging apparatus, since the edges of the previously-bonded sheet are brought into close contact. After the bearings are finished, there may be a slight gap as shown in the drawings, but this gap is taken up again when the bearing is mounted in its machine, so that the inner surface is re-formed into a perfect cylinder.

In FIG. 5 it can be seen that the rod 31 is provided with a reduced portion 31a providing a shoulder against which the unfinished bearing 10 is pressed by the swaging operation. To hold the bearing intact until it has been introduced into the bores 26 and 27, a block 34 of nylon fits snugly around the bearing and the large portion of the rod. As the rod is advanced, the bearing and the rod pass through the block 34. The swaging passages have a good grip on the bearing before it leaves the block entirely.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A process for producing a bearing, comprising the steps of:
   a. preparing a flat layer of plastic and a flat sheet of perforated metal,
   b. bonding the two layers together in flat condition,
   c. performing a preliminary bending of the bonded layers into a rough tube,
   d. swaging the tube into a perfect cylindrical condition, and
   e. finishing the bearing.

2. A process as recited in claim 1, wherein the plastic is polytetrafluoroethylene.

3. A process as recited in claim 1, wherein the crude tube is first introduced into conical counterbores and then into a cylindrical bore.

* * * * *